(12) United States Patent
Schunack et al.

(10) Patent No.: US 8,362,110 B2
(45) Date of Patent: Jan. 29, 2013

(54) SEALANT, IN PARTICULAR FOR RUBBER ARTICLES

(75) Inventors: Michael Schunack, Hannover (DE); Carla Recker, Hannover (DE); Mario Conde, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 12/805,575

(22) Filed: Aug. 6, 2010

(65) Prior Publication Data

US 2011/0086944 A1    Apr. 14, 2011

Related U.S. Application Data

(63) Continuation of application No. PCT/EP2009/050417, filed on Jan. 15, 2009.

(30) Foreign Application Priority Data

Feb. 7, 2008  (DE) .................. 10 2008 007 992

(51) Int. Cl.
*B29C 73/00*      (2006.01)

(52) U.S. Cl. ............ 523/166; 524/17; 524/18; 524/270; 524/274

(58) Field of Classification Search .................. 523/166; 524/17, 18, 270, 274
See application file for complete search history.

(56) References Cited

U.S. PATENT DOCUMENTS

| 2,097,481 | A | 11/1937 | Wallerstein |
| 5,910,567 | A | 6/1999 | Tanaka et al. |
| 6,063,837 | A | 5/2000 | Kawamura et al. |
| 6,335,407 | B1 * | 1/2002 | Tanaka et al. ............... 526/238.3 |
| 6,992,119 | B2 * | 1/2006 | Kojima et al. ................ 523/166 |
| 2004/0014876 | A1 * | 1/2004 | Ichikawa et al. ........... 524/575.5 |
| 2007/0225405 | A1 * | 9/2007 | Cegelski et al. .............. 523/166 |

FOREIGN PATENT DOCUMENTS

| DE | 197 53 630 | 6/1999 |
| EP | 0 584 597 | 3/1994 |
| EP | 0 988 960 | 3/2000 |
| EP | 1 234 836 | 8/2002 |
| GB | 2 098 222 | 11/1982 |

* cited by examiner

*Primary Examiner* — Edward Cain
(74) *Attorney, Agent, or Firm* — Walter Ottesen, P.A.

(57) ABSTRACT

A sealant, in particular for rubber articles, preferably for motor vehicle tires, comprises: 30-90 wt-% of at least one natural rubber latex dispersion; 0.1-10 wt-% of at least one ionic and/or non-ionic emulsifier and/or dispersing agent; 0.0001-10 wt-% of at least one protease; 5-40 wt-% of at least one aqueous adhesive resin dispersion; 1-50 wt-% of at least one antifreeze agent; 0.01-12 wt-% of decomposition products of a deproteinizing reaction; 0-30 wt-% of additional additives.

34 Claims, No Drawings

SEALANT, IN PARTICULAR FOR RUBBER ARTICLES

CROSS REFERENCE TO RELATED APPLICATIONS

This application is a continuation application of international patent application PCT/EP 2009/050417, filed Jan. 15, 2009, designating the United States and claiming priority from German application 10 2008 007 992.8, filed Feb. 7, 2008, and the entire content of both applications is incorporated herein by reference.

FIELD OF THE DISCLOSURE

The disclosure relates to a sealant for sealing the site of damage in a rubber article, in particular in a hollow rubber article, for example, in a pneumatic tire, where, after the sealant has been introduced into the rubber article, it is distributed on the inner wall via rotation, and where the sealant penetrates into and/or is distributed over the site of damage and seals the rubber article.

BACKGROUND OF THE DISCLOSURE

Pneumatic tires in particular suffer damage in the form of tears or holes when they run over sharp objects, the result being loss of air pressure within the tire. Sealants are known for providing a seal as reliable as possible of this type of damage, at least temporarily, that is, for a certain period, until the pneumatic tire can be replaced. These sealants are introduced into the tire, for example, with the aid of a device using a pressure source and a sealant, after unscrewing the valve insert, or directly via the valve.

Sealants of this type are well known from the related art, and mention is made here of the following European patent publications by way of example: EP 0 988 960 B1, U.S. Pat. No. 6,992,119, U.S. Pat. No. 6,063,837; EP 0 584 597 B1; and, German patent publication DE 197 53 630 B4.

EP 0 988 960, DE 197 53 630 and U.S. Pat. No. 6,992,119 disclose sealants based on rubber latex. In these publications, non-deproteinated natural rubber latex is used and dispersing and emulsifying agents are optionally admixed with the sealant. In the sealant based on non-deproteinated natural rubber latex, it is not possible for the dispersing or emulsifying agents to develop their full effect, so that there are therefore only limited possibilities for improving the temperature stability at elevated temperatures, and improvement of susceptibility to coagulation. The presence of proteins in the natural rubber latex moreover causes an increased allergenicity potential.

U.S. Pat. No. 6,063,837 and EP 0 584 597 disclose deproteinated sealants based on natural rubber latex. Here again, dispersing or emulsifying agents are optionally admixed with the sealant. The use of natural rubber latex that has been previously deproteinated improves the temperature stability at elevated temperatures, and improves susceptibility to coagulation, while at the same time reducing allergenicity potential. The deproteinated natural rubber latex here is produced in a separate, complex, multistage process starting from non-deproteinated natural rubber latex. However, in this process it is not possible to remove completely the proteins within the natural rubber latex, and although the allergenic potential can be reduced, it cannot be eliminated.

It is also known that synthetic latices can be used for means of temporary sealing inflatable articles. However, it has been found that these means generally exhibit poorer sealing action than those based on natural rubber latex.

SUMMARY OF THE DISCLOSURE

It is an object of the disclosure herein to provide a sealant which can seal the site of damage in a rubber article and which features the following: a further improvement in temperature stability, in particular at elevated temperatures; a very large reduction in allergenicity potential, or allergenicity potential which is below the detectable limit; and, simplified production.

DESCRIPTION OF THE BEST AND VARIOUS EMBODIMENTS

The object is achieved by a sealant of the above-mentioned type comprising:
from 30 to 90% by weight of at least one natural rubber latex dispersion;
from 0.1 to 10% by weight of at least one ionic and/or nonionic emulsifying and/or dispersing agent;
from 0.0001 to 10% by weight of at least one protease;
from 5 to 40% by weight of at least one aqueous adhesive resin dispersion;
from 1 to 50% by weight of at least one antifreeze;
from 0.01 to 12% by weight of degradation products of a deproteination reaction; and,
from 0 to 30% by weight of further additives.

The % by weight data used in this specification are always based on the total amount of sealant.

Surprisingly, it has been found that the above composition of the sealant achieves an improvement in stability at higher temperatures and a very large reduction in allergenicity potential.

Production of the sealant of the invention is moreover comparatively simple and therefore less expensive on an industrial scale.

The sealant comprises from 30 to 90% by weight, preferably from 30 to 80% by weight, and more preferably from 30 to 70% by weight, of a natural rubber latex dispersion. The natural rubber latex dispersion is a non-deproteinated dispersion. It is possible to use any of the rubber latices that occur naturally, examples being the natural rubber latex from the tropical rubber plant *Hevea brasiliensis*, or else guayule latex, which is obtained from the guayule shrub (*Parthenium argentatum*) by a flotation process, after the shrub has been uprooted and dried, and the branches have been comminuted.

The sealant further comprises from 0.1 to 10% by weight, preferably from 0.5 to 5% by weight, of an ionic and/or nonionic emulsifying and/or dispersing agent.

If this is an ionic, in particular an anionic, surfactant, the material used is primarily a carboxylic acid surfactant, and/or a sulfonic acid surfactant, and/or a sulfate surfactant, and/or a phosphate surfactant.

If this is a nonionic surfactant, the material used is especially a polyoxyalkylene ether surfactant, and/or a polyfunctional alcohol-fatty-acid-ester surfactant, and/or a sugar-fatty-acid-ester surfactant, and/or an alkyl olyglycoside surfactant, and/or a polyoxyalkyl-polyfunctional-alcohol-ether surfactant.

Mixtures of ionic and nonionic surfactants are possible.

Furthermore, from 0.0001 to 10% by weight, preferably from 0.001 to 10% by weight, more preferably from 0.01 to 10% by weight, and still more preferably from 0.1 to 10% by weight, of a protease is added to the sealant. The range of amounts from 0.1 to 8% by weight, and more particularly from 0.1 to 5% by weight, is particularly advantageous here. The protease is here advantageously selected from the group consisting of alkalase and/or esperase and/or savinase and/or liquanase, preference being given to the use of alkalase. The protease serves to degrade the natural proteins occurring in the natural rubber latex. The occurrence of these proteins and the degradation reaction thereof are widely described in the literature. Reference may be made here not only to EP 0 584 597, but also to GB 2098222A and U.S. Pat. No. 2,097,481 A, and by way of example also to the "Handbuch der Kautschuktechnologie", Hoffmann & Gupta, Dr. Gupta Verlag, 2001, chapter 2 [Handbook of rubber technology].

The sealant also comprises from 0.01 to 12% by weight, preferably from 0.1 to 12% by weight, of degradation products of an above-mentioned deproteination reaction. These degradation products are amino acids and/or their oligomers, deriving from the natural proteins of the natural rubber latex, and/or from the protease. The degradation products are detected indirectly, by using an electrophoretic method to monitor the disappearance of the protein band, e.g. by means of SDS-PAGE (abbreviation for sodium dodecyl sulfate polyacrylamide gel electrophoresis). Reference may be made by way of example here to D. J. Siler & K. Cornish, Analytical Biochemistry 229 (1995), pp. 278-281, and H. Schägger & G. von Jagow, Analytical Biochemistry 166 (1987), pp. 368-379.

At least one adhesive resin is present in the sealant, but it is also possible to use several adhesive resins in the mixture, wherein the resins are used as aqueous adhesive resin dispersion in amounts from 5 to 40% by weight, preferably amounts from 5 to 30% by weight, more preferably amounts from 10 to 30% by weight. Natural or synthetic resins can be used as the basis of the adhesive resin dispersion, for example, hydrocarbon resins, which act as tackifiers. The adhesive resin dispersion is preferably one based on rosins and esters thereof, and/or on terpene-phenol resins, and/or on alkynephenol resins, and/or on coumarone-indene resins. Sealants using this type of adhesive resin dispersion exhibit a particularly high bond strength with good sealing effect and have a favorable effect on compatibilization with other components of the sealant. It is particularly advantageous if the adhesive resin dispersion is one based on rosin ester.

Terpene-phenol resins are resins produced via an acid-catalyzed addition reaction of phenols onto terpenes.

The alkyne-phenol resin used can comprise resins which contain, for example, ethyne as alkyne, and which, as phenol component, contain, for example, butylphenol or novolaks derived from formaldehyde and, for example, p-tert-butylphenol (or p-diisobutylphenol).

Coumarone-indene resins are produced in the form of copolymers during the polymerization of the unsaturated compounds present in the light oil of coal tar.

Rosin, which can be obtained from the resin of various coniferous trees, consists in essence of a mixture of resin acids and terpenes. A conventional method is used to esterify the appropriate constituents of rosin. It is therefore possible to react the rosin with alcohols or alcohol mixtures, for example. It is also possible to obtain certain constituents from the rosin, for example, abietic acid, dihydroabietic acid, tetrahydroabietic acid, dihydroabietic acid, isomers thereof and/or mixtures of these, and to react these constituents individually or collectively with alcohols or alcohol mixtures. Examples of preferred alcohols are methanol, ethanol, 1,2,3-propanetriol, and/or pentaerythritol.

So that it can also be used at low temperatures, e.g. for use in the cold season or in polar regions, the sealant comprises from 1 to 50% by weight, preferably from 1 to 40% by weight, of at least one antifreeze. Antifreezes, also termed frost-protection agents, are substances used to lower the freezing point.

The antifreeze here is one selected from the group consisting of ethylene glycol, and/or diethylene glycol, and/or triethylene glycol, and/or diethylene glycol monomethyl ether, and/or propylene glycol, and/or propylene glycol monomethyl ether, and/or dipropylene glycol monomethyl ether, dipropylene glycol, and/or propylene glycol monopropyl ether, and/or ethanol, and/or isopropanol.

However, it is preferable if the antifreeze is ethylene glycol and/or diethylene glycol and/or triethylene glycol and/or propylene glycol, more preferably ethylene glycol.

The sealant comprises from 0 to 30% by weight, preferably from 0 to 20% by weight, particularly at least 0.01% by weight, more particularly at least 0.05% by weight, of further additives. The particularly advantageous minimum amount here is 0.1% by weight, more particularly 0.2% by weight. Antioxidants or preservatives can be added to the sealant for ensuring that the sealant is ready to use after storage. The sealant can moreover comprise foam stabilizers and pH regulators.

It is also possible to add, to the sealant, fillers which contribute particularly to the sealing of larger holes. Examples of fillers that can be used are fibrous materials (natural fibers or synthetic fibers), silicic acid, talcum, chalk, carbon black, rubber powder, metal oxides, other carbonates or silicates or the like.

A method is also provided for producing a sealant with the above composition. The individual components including:
  30 to 90% by weight of at least one natural rubber latex dispersion;
  from 0.1 to 10% by weight of at least one ionic and/or nonionic emulsifying and/or dispersing agent;
  from 0.0001 to 10% by weight of at least one protease;
  from 5 to 40% by weight of at least one aqueous adhesive resin dispersion;
  from 1 to 50% by weight of at least one antifreeze;
  from 0.01 to 12% by weight of degradation products of a deproteination reaction;
  from 0 to 30% by weight of further additives are combined here in a mixing vessel in a chronologically defined sequence.

First, a natural rubber latex dispersion and at least one ionic and/or nonionic emulsifying and/or dispersing agent are combined in a mixing vessel. This combination takes place immediately, and the two components are reacted via stirring within a period of up to 2 hours. Then a protease is added and subjected to a deproteination reaction, via stirring, within a period of up to 24 hours, preferably up to 12 hours, particularly preferably within a period of up to 8 hours. This produces the degradation products of the deproteination reaction. It is critical that these products remain in the mixing vessel. Thereafter, the aqueous adhesive resin dispersion, the antifreeze, and the further additives are added.

One advantage of the above method is that the degradation products of the deproteination reaction remain in the sealant. This leads to a simplified, and therefore less expensive, production of the sealant. In a conventional process, the natural rubber latex is subjected in advance to a deproteination reaction and the corresponding degradation products and deproteinating agents are removed in a complex manner from the natural rubber latex. Another result of this is, inter alia, that the deproteination is incomplete so that the natural rubber latex mostly retains small amounts of allergenic proteins.

The deproteinating agent, that is, the protease, has sufficient time to achieve complete deproteination because it remains in the sealant. Another result is that dispersing and/or emulsifying agents can develop their full effect, with a favorable effect on temperature stability, especially at elevated temperatures.

The sealant is used for sealing a site of damage in a rubber article, in particular a hollow rubber article, where the hollow rubber article is filled with gas, preferably with air, nitrogen or helium. However, the sealant is mostly used for sealing a site of damage in a vehicle tire, where, after the sealant has been introduced into the tire, it is distributed on the inner wall of the tire via rotation of the wheel, and the sealant penetrates into and/or is distributed on the site of damage or site of puncture and seals the damaged site thus preventing any further escape of gas from the tire.

The following sealant E was produced:

44% by weight of a natural rubber latex dispersion with solids content of about 60% (Low Ammonia NR latex, NEOTEX LAT2, Weber & Schaer)

1% by weight of ionic dispersant (sodium lauryl sulfate)

1% by weight of protease (Alkalase, Novozymes Deutschland GmbH)

20% by weight of adhesive resin dispersion (aqueous rosin ester dispersion with solids content of 50%, Eastman Chemical Middelburg BV, The Netherlands)

33% by weight of ethylene glycol.

An improvement in stability at elevated temperatures is apparent with this sealant E, demonstrated via long-term heat aging (45 days at 70° C.) and an improvement in coagulation.

To determine long-term heat aging, in each case a flask with the sealant of the invention and a flask with a reference sealant R were placed in an oven at 70° C. for 45 days. The reference sealant R is a conventional sealant based on a non-deproteinated natural rubber latex dispersion, without addition of any proteases.

Coagulation was then determined via the quantitative sieve residue by means of a sieve with 150 µm pore size, and viscosity was determined with a Brookfield® viscometer.

An index 100 was used for the reference sealant R. Smaller values for coagulation and viscosity represent an improvement. Table 1 shows a marked improvement in these two properties of the sealant E when compared to the reference sealant R.

| Sealant | Coagulation | Viscosity |
| --- | --- | --- |
| R | 100 | 100 |
| E | 16 | 33 |

The two sealants, in non-aged condition, exhibit equally good properties when used for sealing sites of damage in a tire.

It is understood that the foregoing description is that of the preferred embodiments of the disclosure and that various changes and modifications may be made thereto without departing from the spirit and scope of the disclosure as defined in the appended claims.

What is claimed is:

1. A sealant for rubber articles, comprising:
   from 30 to 90% by weight of at least one natural rubber latex dispersion;
   from 0.1 to 10% by weight of at least one ionic and/or nonionic emulsifying and/or dispersing agent;
   from 0.01 to 10% by weight of at least one protease;
   from 5 to 40% by weight of at least one aqueous adhesive resin dispersion;
   from 1 to 50% by weight of at least one antifreeze;
   from 0.01 to 12% by weight of degradation products of a deproteination reaction;
   from 0 to 30% by weight of further additives,
   wherein the at least one aqueous adhesive resin dispersion is a rosin ester based resin.

2. The sealant as claimed in claim 1, comprising from 30 to 80% by weight of the at least one natural rubber latex dispersion.

3. The sealant as claimed in claim 1, comprising from 30 to 70% by weight of the at least one natural rubber latex dispersion.

4. The sealant as claimed in claim 1, comprising from 0.5 to 8% by weight of the at least one ionic and/or nonionic emulsifying and/or dispersing agent.

5. The sealant as claimed in claim 4, comprising from 0.5 to 5% by weight of the at least one ionic and/or nonionic emulsifying and/or dispersing agent.

6. The sealant as claimed in claim 1, wherein the at least one ionic emulsifying and/or dispersing agent is an ionic surfactant.

7. The sealant as claimed in claim 6, wherein the ionic surfactant is an anionic surfactant.

8. The sealant as claimed in claim 7, wherein the anionic surfactant is selected from the group consisting of: a carboxylic acid surfactant, a sulfonic acid surfactant, a sulfate surfactant, and a phosphate surfactant, or a mixture thereof.

9. The sealant as claimed in claim 1, wherein the at least one nonionic emulsifying and/or dispersing agent is a nonionic surfactant.

10. The sealant as claimed in claim 9, wherein the nonionic surfactant is selected from the group consisting of: a polyoxyalkylene ether surfactant, a polyfunctional alcohol-fatty-acid-ester surfactant, a sugar-fatty-acid-ester surfactant, an alkyl polyglycoside surfactant, and a polyoxyalkyl-polyfunctional-alcohol-ether surfactant, or a mixture thereof.

11. The sealant as claimed in claim 1,
    comprising from 0.1 to 10% by weight of the at least one protease.

12. The sealant as claimed in claim 1,
    comprising from 0.1 to 8% by weight of the at least one protease.

13. The sealant as claimed in claim 1,
    comprising from 0.1 to 5% by weight of the at least one protease.

14. The sealant as claimed in claim 1, wherein the at least one protease is selected from the group consisting of alkalase, esperase, savinase, liquanase, or a mixture thereof.

15. The sealant as claimed in claim 14, wherein the at least one protease is alkalase.

16. The sealant as claimed in claim 1, comprising from 5 to 30% by weight of the at least one aqueous adhesive resin dispersion.

17. The sealant as claimed in claim 16, comprising from 10 to 30% by weight of the at least one aqueous adhesive resin dispersion.

18. The sealant as claimed in claim 1, comprising from 1 to 40% by weight of the at least one antifreeze.

19. The sealant as claimed in claim 1, wherein the at least one antifreeze is selected from the group consisting of ethylene glycol, diethylene glycol, triethylene glycol, diethylene glycol monomethyl ether, propylene glycol, propylene glycol monomethyl ether, dipropylene glycol monomethyl ether, dipropylene glycol, propylene glycol monopropyl ether, ethanol, and isopropanol, or a mixture thereof.

20. The sealant as claimed in claim 19, wherein the at least one antifreeze is selected from the group consisting of: ethylene glycol, diethylene glycol, triethylene glycol, and propylene glycol, or a mixture thereof.

21. The sealant as claimed in claim 19, wherein the at least one antifreeze is ethylene glycol.

22. The sealant as claimed in claim 1, comprising from 0.1 to 12% by weight of the degradation products of a deproteination reaction.

23. The sealant as claimed in claim 1, wherein the degradation products of the deproteination reaction are amino acids, oligomers of amino acids, or a mixture thereof.

24. The sealant as claimed in claim 1, comprising from 0 to 20% by weight of the further additives.

25. The sealant as claimed in claim 1, comprising at least 0.01% by weight of the further additives.

26. The sealant as claimed in claim 25, comprising at least 0.1% by weight of the further additives.

27. The sealant as claimed in claim 24, wherein the further additives comprise one or more antioxidants.

28. A process for producing a sealant as claimed in claim 1, wherein the individual components are combined in a mixing vessel in a chronologically defined sequence.

29. The process for producing a sealant as claimed in claim 28, wherein the at least one natural rubber latex dispersion and the at least one ionic and/or nonionic emulsifying and/or dispersing agent are first combined in a mixing vessel, and then a protease is added, where the degradation products of a deproteination reaction are produced and remain in the mixing vessel, and then the at least one aqueous adhesive resin dispersion, the at least one antifreeze, and the further additives are added to the mixing vessel.

30. A method for sealing of a site of damage in a rubber article, comprising applying the sealant as claimed in claim 1 to the rubber article.

31. The method as claimed in claim 30, for sealing of a site of damage in a hollow rubber article.

32. The method as claimed in claim 31, for sealing of a site of damage in a hollow rubber article filled with a gas.

33. The method as claimed in claim 30, for sealing of a site of damage in a tire.

34. The method as claimed in claim 33, for sealing of a site of damage in a tire, where, after the sealant has been introduced into the tire, the sealant is distributed on the inner wall of the tire via rotation of the wheel, and the sealant penetrates into and/or is distributed over the site of damage or site of puncture, and seals the same, thus preventing any further escape of a gas from the tire.

* * * * *